US011251666B2

(12) United States Patent
Yoshida et al.

(10) Patent No.: US 11,251,666 B2
(45) Date of Patent: Feb. 15, 2022

(54) MOTOR AND ELECTRICAL PRODUCT

(71) Applicant: Nidec Corporation, Kyoto (JP)

(72) Inventors: Yusaku Yoshida, Dalian (CN); Tatsuya Onishi, Dalian (CN); Xiao Zhang, Dalian (CN); Yu Wang, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 77 days.

(21) Appl. No.: 16/824,736

(22) Filed: Mar. 20, 2020

(65) Prior Publication Data

US 2020/0381966 A1    Dec. 3, 2020

(30) Foreign Application Priority Data

May 31, 2019 (CN) .......................... 201910468259.1

(51) Int. Cl.
*H02K 1/27*    (2006.01)
*H02K 1/18*    (2006.01)

(52) U.S. Cl.
CPC ........... *H02K 1/2793* (2013.01); *H02K 1/187* (2013.01)

(58) Field of Classification Search
CPC .............................. H02K 1/28; H02K 1/2773
USPC ... 310/216.004, 216.044, 216.049, 413–415, 310/432
See application file for complete search history.

(56) References Cited

U.S. PATENT DOCUMENTS

| 1,674,876 | A | * | 6/1928 | Thompson | ............. | H02K 1/185 |
| | | | | | | 310/407 |
| 3,226,621 | A | * | 12/1965 | Heinemann | .......... | H02K 7/1025 |
| | | | | | | 318/777 |
| 2007/0278979 | A1 | * | 12/2007 | Hashimoto | ............ | H02K 15/16 |
| | | | | | | 318/538 |
| 2014/0145548 | A1 | * | 5/2014 | Asao | ........................ | H02K 5/06 |
| | | | | | | 310/216.114 |

* cited by examiner

*Primary Examiner* — Jose A Gonzalez Quinones
(74) *Attorney, Agent, or Firm* — Keating & Bennett

(57) ABSTRACT

A motor includes a rotating shaft extending along a central axis, a stator core arranged about the rotating shaft by being centered on the central axis, a housing arranged about the stator core in a circumferential direction and including an opening on one side in an axial direction, and a support covering the opening. A functional component is mounted on at least one side of the support in the axial direction. The motor further includes a fastener disposed in the axial direction to secure the support, the stator core, and the housing.

7 Claims, 5 Drawing Sheets

MOTOR AND ELECTRICAL PRODUCT

CROSS REFERENCE TO RELATED APPLICATION

The present application claims priority under 35 U.S.C. § 119 to Chinese Application No. 201910468259.1 filed on May 31, 2019, the entire contents of which are hereby incorporated herein by reference.

1. FIELD

The present disclosure relates to a motor and an electrical product.

2. BACKGROUND

In conventional motors, it is necessary to secure a stator core of the motor and a housing, and secure a bearing holder and the housing. Regarding the securing, it is common that the bearing holder and the stator core are respectively tightly secured to the housing through shrinkage fitting.

It should be noted that this introduction is merely provided for the convenience of clearly and comprehensively describing the technical solutions of the disclosure and facilitating the understanding of those skilled in the art. These technical solutions discussed above shall not be deemed well-known by those skilled in the art simply for having been described in Background.

SUMMARY

However, the inventors of the instant application discovered that the conventional structure described above is applicable to an internal rotor motor because a bearing holder usually needs only to support the weight of a bus bar assembly mounted on a side of the bearing holder in an axial direction, so a requirement on the fastening force generated between the bearing holder and the housing through shrinkage fitting is not relatively high. However, in the case of electro-mechanical brake (EMB) motors, another functional component, such as an electromagnetic clutch, is arranged on a side of the bearing holder in the axial direction, and the electromagnetic clutch is relatively heavy. Therefore, the bearing holder needs to provide greater support force in the axial direction, and the fastening force generated between the conventional bearing holder and the housing through the shrinkage fitting is not enough to support the relatively heavy electromagnetic clutch.

According to an example embodiments of the present disclosure, a motor includes a rotating shaft extending along a central axis, a stator core arranged about the rotating shaft by being centered on the central axis, a housing arranged about the stator core in a circumferential direction, and including an opening on at least one side in an axial direction, and a support covering the opening, and a functional component being mounted on at least one side of the support in the axial direction. The motor further includes a fastener disposed in the axial direction, to secure the support, the stator core, and the housing.

According to another example embodiments of the present disclosure, an electrical product includes the motor described above.

The above and other elements, features, steps, characteristics and advantages of the present disclosure will become more apparent from the following detailed description of the example embodiments with reference to the attached drawings.

DETAILED DESCRIPTION

The foregoing and other features of the disclosure will become apparent from the following specification with reference to the accompanying drawings. Specific example embodiments of the present disclosure are disclosed in the following specification and the accompanying drawings. The following specification and the accompanying drawings describe several example embodiments to which the principles of the disclosure are applicable. However, it should be understood that, the present disclosure is not limited to the example embodiments described herein, but shall include all modifications, variations and equivalents falling within the scope of the appended claims.

In the example embodiments of the present disclosure, terms such as "first", "second" are used to distinguish different elements in terms of names, and are not used to indicate a spatial arrangement or a time sequence of these elements, and these elements should not be limited by these terms. The term "and/or" includes any and all combinations of one or more of listed associated terms. Terms such as "comprise", "include", and "have" refer to the existence of the described features, elements, devices or components, but do not exclude the existence or addition of one or more other features, elements, devices or components.

In the example embodiments of the present disclosure, singular forms such as "a/an" and "the" include plural forms and should be understood in a broad sense as a meaning of "a type" or "a kind" instead of "one". In addition, the term "the" should be understood as including both a singular form and a plural form, unless otherwise clearly stated in the context. In addition, the term "according to" should be understood as "at least partially according to . . . ", and the term "based on" should be understood as "at least partially based on . . . ", unless otherwise clearly stated in the context.

In the following description of the present disclosure, for the convenience of description, a direction extending along or parallel or substantially parallel to a central axis of a motor is referred to as an "axial direction", a radial direction that is centered on the central axis is referred to as a "radial direction", and a direction about the central axis is referred to as a "circumferential direction". However, these definitions are only for convenience of description and are not intended to limit the directions of the motor during manufacturing and in use.

The example embodiment of the disclosure provides a motor.

Figure 1:
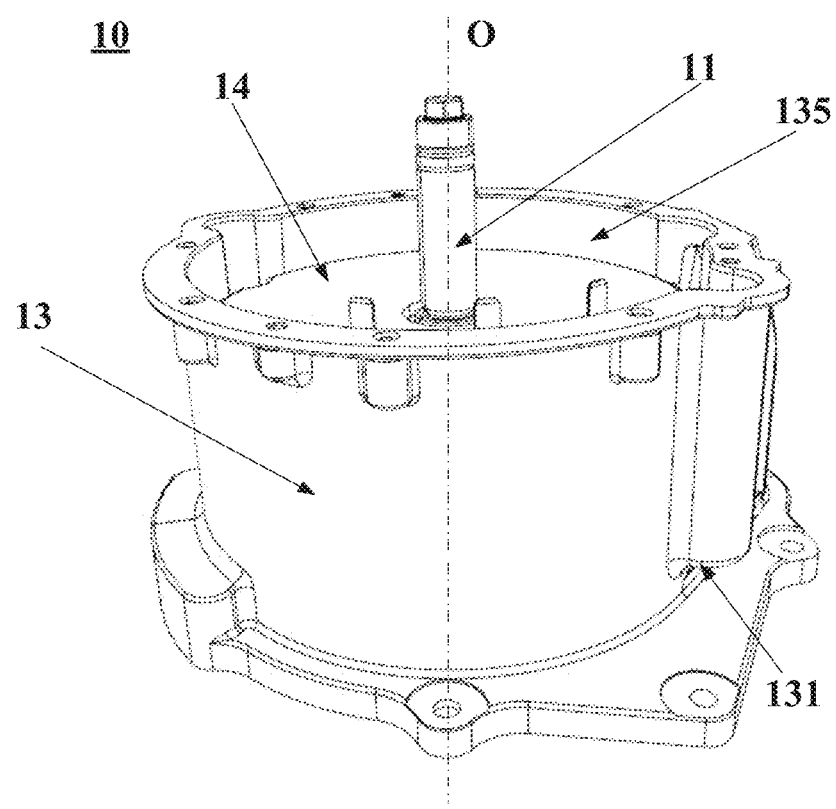
FIG. 1 is a schematic view of a structure of a motor according to an example Embodiment 1 of the present disclosure.
Figure 2:
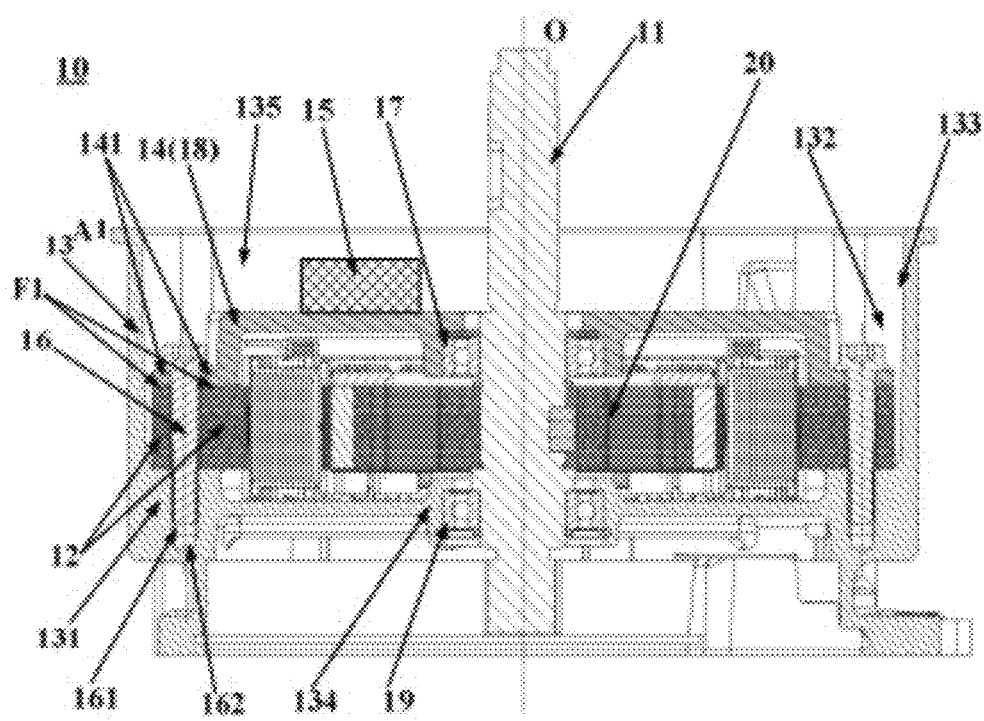
FIG. 2 is a cross-sectional view of the motor along a central axis O according to an example embodiment of the present disclosure.
Figure 3:
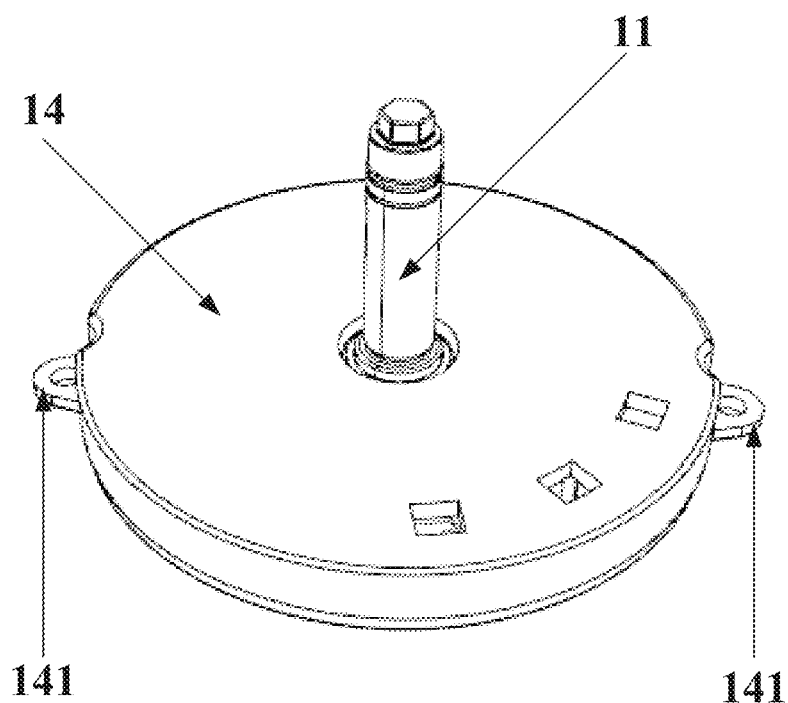
FIG. 3 is a schematic diagram of a support member according to an example embodiment of the present disclosure.

FIG. 1 is a schematic view of a structure of a motor according to Example Embodiment 1 of the disclosure. FIG. 2 is a cross-sectional view of the motor along a central axis O according to Example Embodiment 1 of the disclosure. FIG. 3 is a schematic diagram of a support member of the motor according to Example Embodiment 1 of the present disclosure.

As shown in FIG. 1 and FIG. 2, a motor 10 includes a rotating shaft 11, a stator core 12, a housing 13, and a support member 14.

The rotating shaft 11 extends along the central axis O. The stator core 12 is arranged about the rotating shaft 11 by centering on the central axis O. The housing 13 is arranged about the stator core 12 in a circumferential direction, and includes an opening 135 on at least one side A1 (upper side in FIG. 2) of the motor 10 in an axial direction. The support member 14 covers the opening 135, and a functional component 15 is mounted on at least one side of the support member 14 in the axial direction.

In the present example embodiment, as shown in FIG. 2, the motor 10 further includes a fastener 16, and the fastener 16 is disposed in the axial direction, to secure the support member 14, the stator core 12, and the housing 13.

With the structure, the support member 14, the stator core 12, and the housing 13 are secured by the fastener 16 in the axial direction, so that the support member 14 is able to generate enough support force to support the functional component 15 mounted on the support member 14. The functional component 15 being directly mounted on the support member 14 helps miniaturize the entire structure and makes the assembling easy.

In the present example embodiment, the functional component 15 may be an electromagnetic clutch. However, the present example embodiment is not limited thereto. The functional component 15 may also be other relatively heavy components.

In the present example embodiment, the fastener 16 may be a type of screw.

In the present example embodiment, as shown in FIG. 1 and FIG. 2, a step portion 131 is provided on an inner circumference of the housing 13. The step portion 131 is located on a side of the stator core 12 that is away from the support member 14 in the axial direction. In this way, the fastener 16 penetrates the support member 14 and the stator core 12 and is secured in the step portion 131, to allow the support member 14 and the step portion 131 to abut against the stator core 12 in the axial direction.

Therefore, with the step portion 131, the support member 14, the stator core 12, and the housing 13 are easily secured by the fastener 16 in the axial direction.

However, in the present example embodiment, the structure of the housing 13 is not limited to the form including the step portion 131. In other words, the present example embodiment covers any form of the structure as long as the support member 14, the stator core 12, and the housing 13 are able to be secured by the fastener 16 in the axial direction.

In the present example embodiment, the securing of the support member 14, the stator core 12, and the housing 13 by the fastener 16 is not strictly limited to the axial direction. That is, the fastener 16 is not precisely disposed in the axial direction. The fastener 16 may also secure the three components in a substantially axial direction.

In the present example embodiment, as shown in FIG. 2, an edge portion 141 is formed by at least a portion of a radially outer circumference of the support member 14 extending along a surface F1 of the stator rotor 12 in the axial direction. In this way, the fastener 16 penetrates the edge portion 141 and the stator core 12 and is secured in the step portion 131 to allow the edge portion 141 and the step portion 131 to abut against the stator core 12 in the axial direction.

Therefore, the support member 14 and the step portion 131 are reliably secured to the stator core 12 by the fastener 16, which does not excessively occupy a radially internal space of the motor, and does not interfere with the arrangement of other components inside the motor.

In the present example embodiment, as shown in FIG. 2, the edge portion 141 is closer to the stator core 12 in the axial direction than other portions of the support member 14. In the cross-sectional view, the support member 14 is substantially in a shape of a "top hat". The edge portion 141 of the support member 14 is a brim part of the top hat. Other portions of the support member 14 constitute a body part of the top hat. The edge portion 141 is closer to the stator core 12 in the axial direction than other portions of the support member 14. In this way, the edge portion 141 of the support member 14 is in contact with the stator core 12, and other portions of the support member 14 are not in contact with the stator core 12.

Therefore, when the support member 14, the stator core 12, and the housing 13 are secured by the fastener 16 in the axial direction, a sufficient arrangement space is provided between the support member 14 and an axial direction of a rotor 20 located on a radially inner side of the motor without interfering the arrangement of other components in the axial direction. When the components are secured by the fastener 16, the fastener 16 does not protrude out of other portions of the support member 14, which prevents the fastener 16 from interfering with other components during assembly.

In the present example embodiment, the edge portion 141 may be provided on the entire radial outer circumference of the support member 14. However, the present example embodiment is not limited thereto. For example, as shown in FIG. 3, the edge portion 141 may also be a protrusion structure provided by extending a portion of the radial outer circumference of the support member 14.

Figure 4:
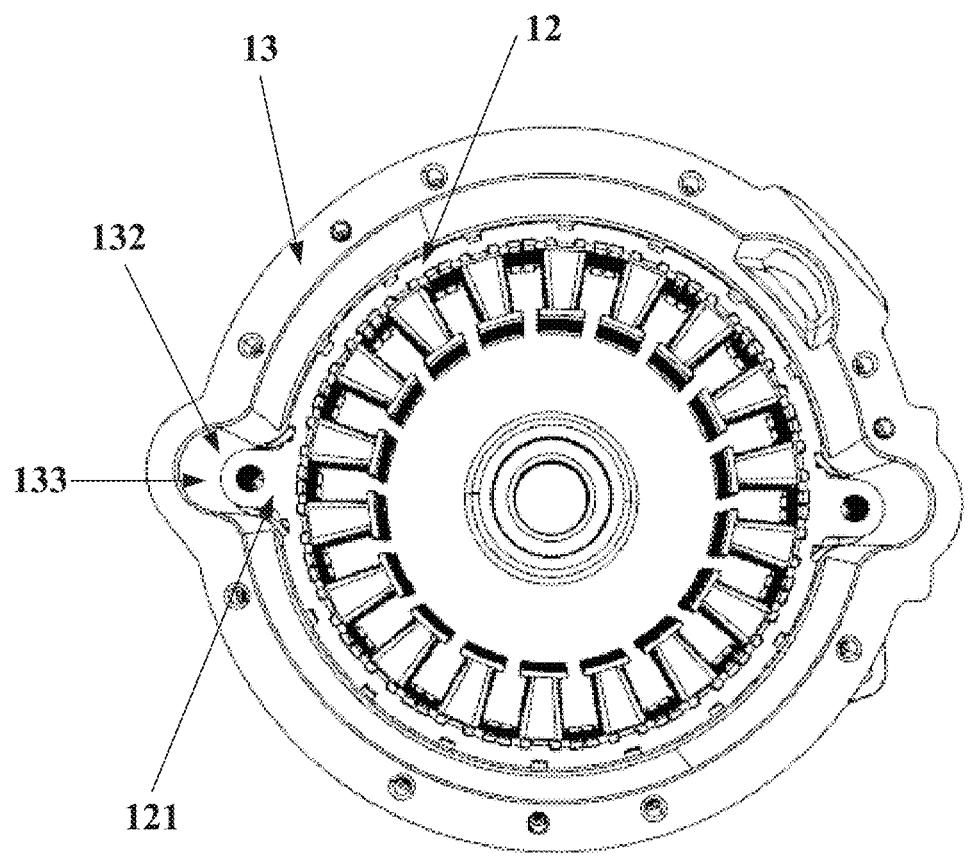
FIG. 4 is a top view of the motor according to an example embodiment of the present disclosure.

FIG. 4 is a top view of the motor according to Example Embodiment 1 of the present disclosure. The support member 14 and the rotating shaft 11 of the motor are omitted FIG. 4.

In the present example embodiment, as shown in FIG. 4, the stator core 12 is provided with a first protruding portion 121 protruding toward a radially outer side. At least a portion of the inner circumference of the housing 13 is recessed toward the radially outer side to provide a recessed space 132 on the inner circumference of the housing 13. The first protruding portion 121 is located in the recessed space 132.

Therefore, it is easy to position the stator core 12 relative to the housing 13 in the circumferential direction.

In the present example embodiment, as shown in FIG. 4, the first protruding portion 121 protrudes toward, but not on the entire circumference, the radially outer side in the circumferential direction. Similarly, the recessed space 132 is provided by the inner circumference of the housing 13 being recessed, but not recessed on the entire circumference, toward the radially outer side in the circumferential direction.

Figure 5:
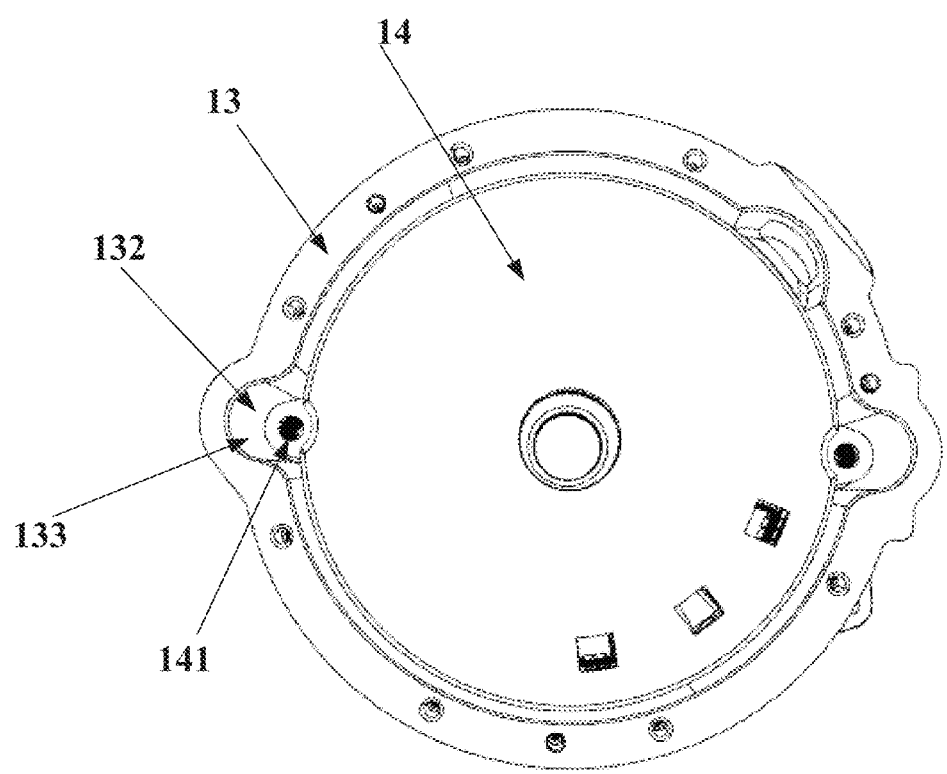
FIG. 5 is another top view of the motor according to an example embodiment of the present disclosure.

FIG. 5 is another top view of the motor according to Example Embodiment 1 of the present disclosure. The rotating shaft 11 of the motor is not included in FIG. 5.

In the present example embodiment, as described above, the edge portion 141 may be a protrusion structure provided by a portion of the radially outer circumference of the support member 14 extending along a surface of the stator core 12 in the radial direction. As shown in FIG. 5, the edge portion 141 is located in the recessed space 132.

With the structure, the support member 14 is easily positioned relative to the housing 13 in the circumferential direction.

In the present example embodiment, as shown in FIG. 1 and FIG. 4, the position of the step portion 131 in the circumferential direction is the same as the position of the recessed space 132 in the circumferential direction. In other words, the step portion 131 may be provided on the circumference, but not the entirety thereof, of the housing 13, that is, the step portion 131 is provided on a portion of the housing 13 in the circumferential direction. The position of the step portion 131 in the circumferential direction of the housing 13 is the position of the recessed space 132 in the circumferential direction. In this way, as shown in FIG. 2, the fastener 16 penetrates the edge portion 141 and the first protruding portion 121 in the recessed space 132, and is secured in the step portion 131.

Therefore, when positioning in the circumferential direction is realized by using the first protruding portion 121, the recessed space 132, and the edge portion 141, the fastener 16 is disposed at the position in the motor 10, to secure the three to one another. Moreover, because the step portion 131, the first protruding portion 121, the recessed space 132, and the edge portion 141 are not disposed on the entire circumference, the motor is able to be miniaturized.

In the present example embodiment, the quantities of the step portion 131, the first protruding portion 121, the recessed space 132, the edge portion 141, and the fasteners 16 are same. For example, the quantity of each of the step portion 131, the first protruding portion 121, the recessed space 132, the edge portion 141, and the fastener 16 is two.

In the present example embodiment, as shown in FIG. 4 and FIG. 5, the first protruding portion 121 and the edge portion 141 are not in contact with an inner surface 133 (inner circumference) of the housing 13 in the recessed space 132.

Therefore, to avoid the inability to mount resulting from a difference between a position at which the first protruding portion 121 and the edge portion 141 contact and are therefore positioned by the inner surface of the housing 13 and a position fastened by the fastener 16 and positioned, the stator core 12 and the support member 14 are secured by being fastened by the fastener 16 under a condition that the stator core 12 and the support member 14 are substantially positioned in the circumferential direction through the recessed space.

In the present example embodiment, as shown in FIG. 2, the motor 10 may further include a first bearing 17 located on a side of the stator core 12 in the axial direction, and supports rotation of the rotating shaft 11 on an outer circumference of the rotating shaft 11. The support member 14 functions as a first bearing holder 18. The first bearing holder 18 at least supports the first bearing 17 in the radial direction.

As shown in FIG. 2, the fastener 16 penetrates the first bearing holder 18 and the stator core 12 and is secured in the step portion 131, to allow the first bearing holder 18 and the step portion 131 to abut against the stator core 12 in the axial direction.

In the present example embodiment, as shown in FIG. 2, the motor 10 may further include a second bearing 19. The second bearing 19 is located on the other side of the stator core 12 in the axial direction. The housing 13 includes a second bearing holder 134. The second bearing holder 134 at least supports the second bearing 19 in the radial direction. The second bearing 19 is in interference fit with the second bearing holder 134, and the second bearing holder 134 and the housing 13 are formed integrally.

With this structure, since the second bearing holder 134 and the housing 13 are formed integrally, the manufacturing process is simple. By fastening the first bearing 17, the first bearing holder 18, the housing 13, the second bearing holder 134, and the second bearing 19 using only the fastener 16, positioning in the axial direction may be realized.

In the present example embodiment, as shown in FIG. 2, an end 161 of the fastener 16 that is close to the housing 13 in the axial direction does not penetrate the housing 13. In other words, the step portion 131 of the housing 13 is not penetrated through by the end 161 of the fastener 16 toward the inserting direction for inserting into the support member 14 and the stator core 12. Therefore, the housing is easily sealed.

In the present example embodiment, as shown in FIG. 2, a gap 162 is provided, in a direction opposing to the housing 13 on the axial direction, at the end 161 of the fastener 16 toward the inserting direction for inserting into the support member 14 and the stator core 12. Therefore, the size of the fastener 16 is not strictly required, making an assembly design of the motor more flexible.

In the present example embodiment, as shown in FIG. 1 and FIG. 2, the motor 10 may further include components other than the foregoing components. Details concerning the structures of other components of the motor 10 are readily available in the conventional art and therefore will not be reiterated hereinafter.

With the structure of the motor of the present disclosure, the support member 14, the stator core 12, and the housing 13 are secured in the axial direction by the fastener 16. Accordingly, the support member 14 is able to generate sufficient support force to support the functional component 15 mounted on the support member 14.

The example embodiments of the present disclosure further provide an electrical product. The electrical product includes the motor described in the Example Embodiment 1 of the present disclosure. Since the structure of the motor has been described in detail in example Embodiment, the contents of the motor have been incorporated, and details thereof will not be repeated in the following.

In the present example embodiment, the electrical product may be any electrical product including the motor. For example, the electrical product may be an in-vehicle product, such as a braking system, or may be a household appliance adjusting system. Alternatively, the motor may also be used as a motor in various information devices, industrial devices, etc.

According to the structure of the motor in the electrical product of the present example embodiment, the support member 14, the stator core 12, and the housing 13 are secured in the axial direction by the fastener 16. Accordingly, the support member 14 is able to generate enough support force to support the functional component 15 mounted on the support member 14.

The foregoing describes the present disclosure with reference to specific example embodiments. However, a person skilled in the art should understand that these descriptions are exemplary, and are not intended to limit the protection scope of the present disclosure. A person skilled in the art may make various variations and modifications to the present disclosure based on the spirit and principles of the present disclosure, and those variations and modifications also fall within the scope of the present disclosure.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a rotating shaft extending along a central axis;
a stator core arranged about the rotating shaft by being centered on the central axis;
a housing arranged about the stator core in a circumferential direction and including an opening on at least one side in an axial direction; and
a support covering the opening;
a functional component mounted on at least one side of the support in the axial direction; and
a fastener disposed in the axial direction to secure the support, the stator core, and the housing; wherein
a step portion is provided on the housing and located on a side of the stator core spaced away from the support in the axial direction;
the fastener penetrates the support and the stator core and is secured in the step portion, to allow the support and the step portion to abut against the stator core in the axial direction;
an edge portion is provided by at least a portion of a radially outer circumference of the support extending along a surface of the stator core in the axial direction;
the fastener penetrates the edge portion and the stator core and is secured in the step portion, to allow the edge portion and the step portion to abut against the stator core in the axial direction;
the stator core is provided with a first protruding portion protruding toward a radially outer side;
a recessed space is provided on an inner circumference of the housing by recessing at least a portion of the inner circumference of the housing toward the radially outer side;
the first protruding portion is located in the recessed space;
the edge portion is located in the recessed space;
a position of the step portion in the circumferential direction is the same as a position of the recessed space in the circumferential direction;
the fastener penetrates the edge portion and the first protruding portion in the recessed space, and is secured in the step portion; and
the first protruding portion and the edge portion are not in contact with an inner surface of the housing in the recessed space.

2. The motor according to claim 1, wherein the edge portion is closer to the stator core in the axial direction than other portions of the support.

3. The motor according to claim 1, further comprising a first bearing located on a side of the stator core in the axial direction to support rotation of the rotating shaft on an outer circumference of the rotating shaft; and
the support includes a first bearing holder that at least supports the first bearing in a radial direction.

4. The motor according to claim 3, wherein
a step portion is provided on the housing and located on a side of the stator core that is spaced away from the first bearing holder in the axial direction;
the fastener penetrates the first bearing holder and the stator core and is secured in the step portion, to allow the first bearing holder and the step portion to abut against the stator core in the axial direction;
the motor further comprises a second bearing located on another side of the stator core in the axial direction;
the housing includes a second bearing holder at least supporting the second bearing in the radial direction, and the second bearing being interference fit with the second bearing holder; and
the second bearing holder and the housing are integral with each other.

5. The motor according to claim 1, wherein an end of the fastener that is adjacent to the housing in the axial direction does not penetrate the housing.

6. The motor according to claim 5, wherein a gap is provided, in a direction opposing to the housing on the axial direction, at the end of the fastener.

7. An electrical product comprising the motor according to claim 1.

* * * * *